United States Patent [19]

Ueki

[11] 4,386,380
[45] May 31, 1983

[54] TAPE PLAYER CONTROL DEVICE

[75] Inventor: Yoshiharu Ueki, Kawagoe, Japan

[73] Assignee: Pioneer Electronic Corporation, Tokyo, Japan

[21] Appl. No.: 185,686

[22] Filed: Sep. 10, 1980

[30] Foreign Application Priority Data

Sep. 11, 1979 [JP] Japan .......................... 54-124625[U]

[51] Int. Cl.³ ............................................ G11B 15/22
[52] U.S. Cl. ................................................. 360/74.1
[58] Field of Search ............................... 360/74.1–74.7

[56] References Cited

U.S. PATENT DOCUMENTS 4,005,484 1/1977 Fujita ................................. 360/74.7
4,215,378 7/1980 Sato et al. .......................... 360/74.1
4,302,786 11/1981 Takeuchi ........................... 360/74.4

Primary Examiner—Robert S. Tupper
Attorney, Agent, or Firm—Balogh, Osann, Kramer, Dvorak, Genova & Traub

[57] ABSTRACT

A control device for use in a tape player is provided. By this control device, the tape playback mode may be freely selected among unidirectional playback operation wherein a recorded tape is played back only in one direction, automatic reverse playback operation wherein a recorded tape is played back in one direction, automatic reverse playback operation wherein a recorded tape is played back in one direction and then in the opposite direction as a result of automatic reversal of tape transportation direction at the tape end, and automatic repeated reverse playback operation wherein a recorded tape is repeatedly played back both in one and opposite directions as a result of automatic repeated reversal of tape transportation direction at the tape end.

3 Claims, 2 Drawing Figures

TAPE PLAYER CONTROL DEVICE

BACKGROUND OF THE INVENTION

This invention relates to a control device for a cassette tape player in which playback operation can be selected among unidirectional playback operation wherein the tape is played back only in one direction, automatic reverse playback operation wherein tape is played back in one and reverse directions before and after it is reversed of its transportation direction at its end, and automatic repeated playback operation wherein tape is repeatedly played back in one and reverse directions before and after it is reversed of its transportation direction at its ends.

In prior art tape players, typically cassette tape players, a particular one player is designed for either unidirectional playback operation or automatic repeated playback operation. No single tape player has been presented having both the functions of selecting its playback direction and selecting repeated playback operation.

SUMMARY OF THE INVENTION

It is therefore an object of the present invention to provide a control device for use in a tape player by which the tape playback mode may be freely selected among unidirectional playback operation wherein a recorded tape is played back only in one direction, automatic reverse playback operation wherein a recorded tape is played back in one direction and then in the opposite direction as a result of automatic reversal of tape transportation direction at the tape end, and automatic repeated reverse playback operation wherein a recorded tape is repeatedly played back both in one and opposite directions as a result of automatic repeated reversal of tape transportation direction at the tape end.

BRIEF DESCRIPTION OF THE DRAWING

The invention will be more readily understood from the following description with reference to the accompanying drawings, in which.

DETAILED DESCRIPTION OF THE PREFERRED EMBODIMENT

Figure 1:
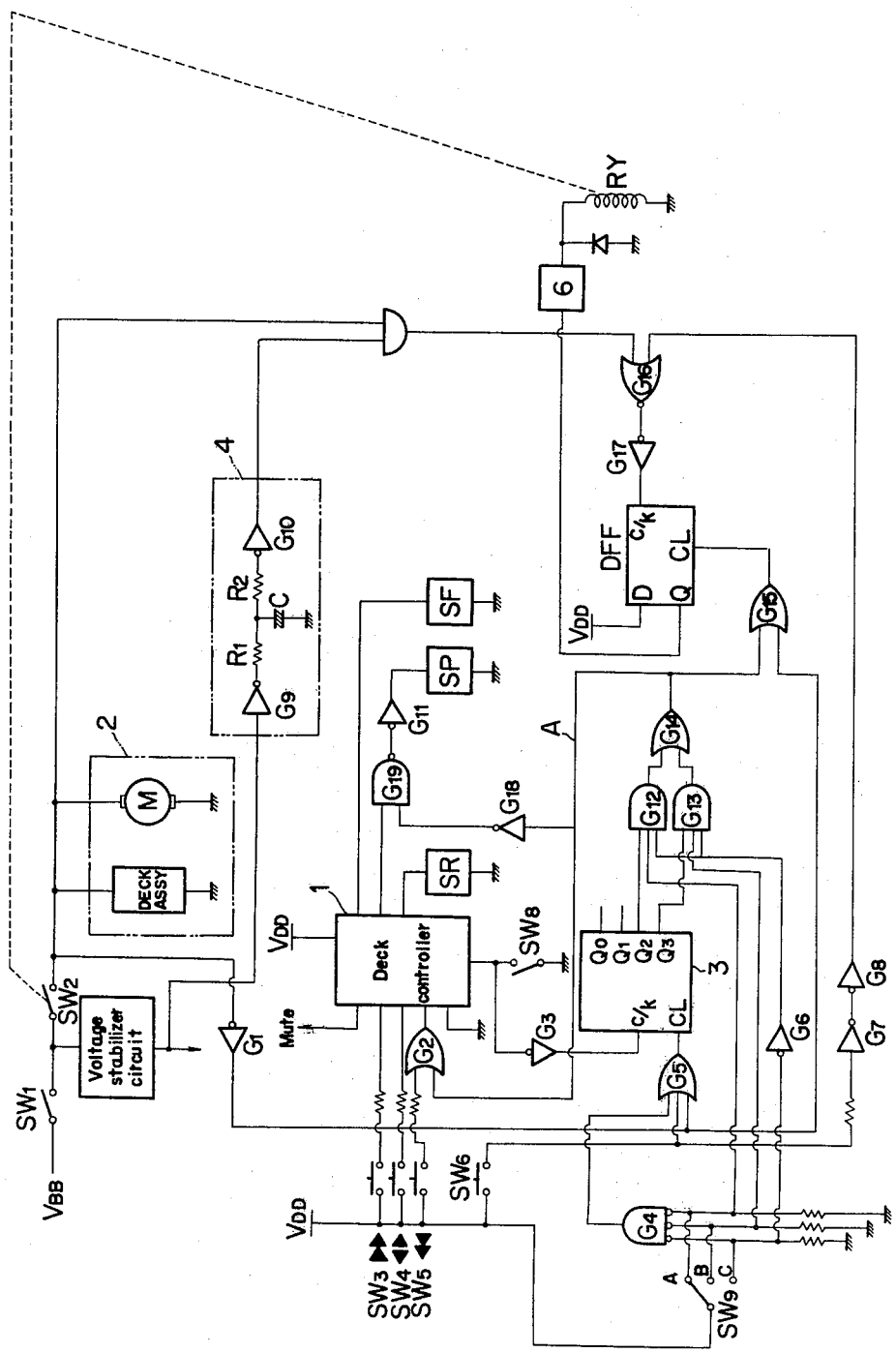
FIG. 1 is a circuit diagram showing one embodiment of the tape player control device according to the present invention.

Referring to FIG. 1, a circuit according to one embodiment of the present invention includes a switch SW1 which is closed upon loading of a recorded tape, and a switch SW2 which is closed by a relay RY to allow voltage application to a tape player via a voltage stabilizer circuit 5.

Figure 2:
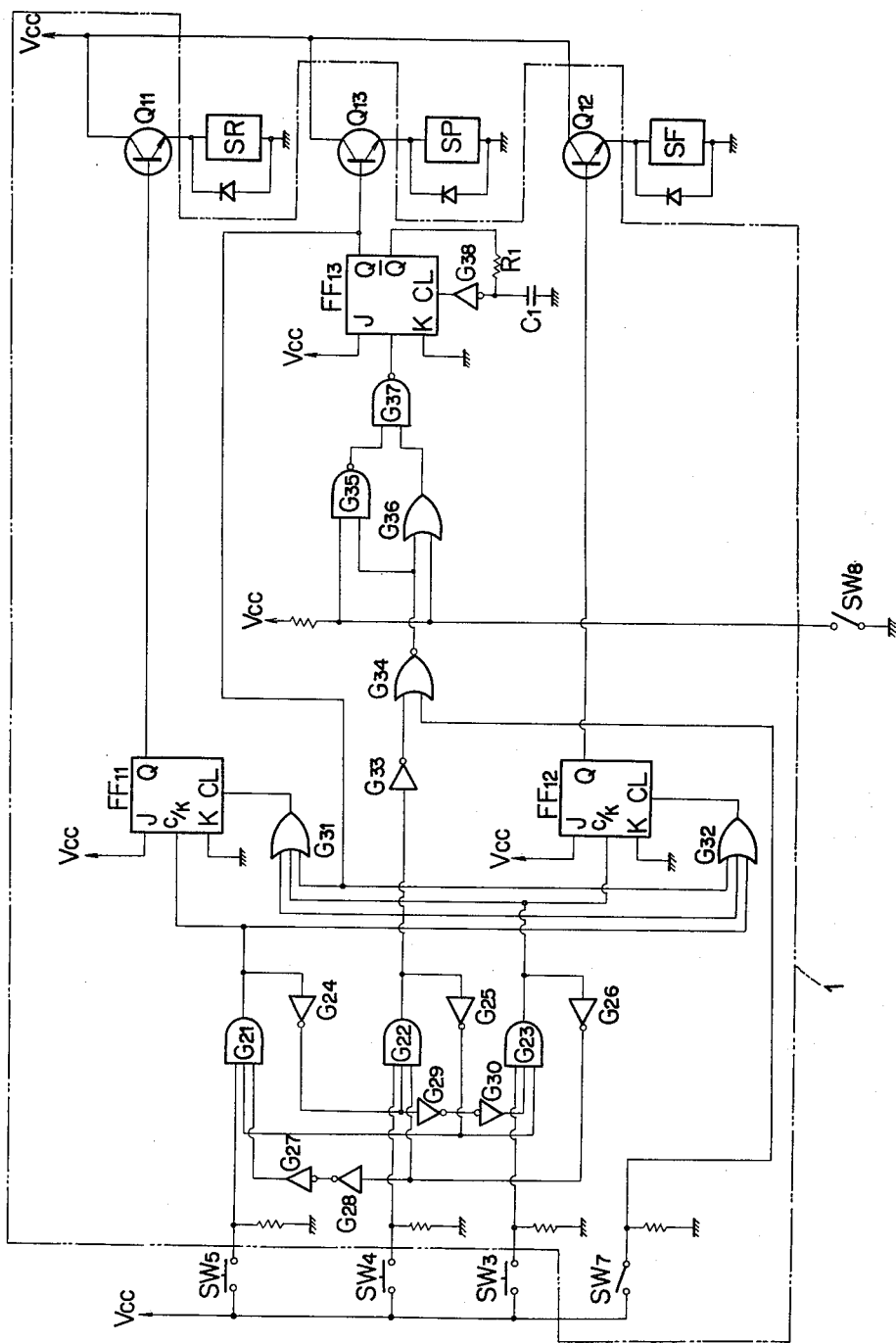
FIG. 2 is a circuit diagram showing one example of the control circuit included in the control device of FIG. 1.

A block 1 designates a tape deck plunger control circuit (to be referred to as "control circuit", hereinafter) and a block 2 designates a deck assembly, both of which are described in detail in the copending Japanese Patent Application KOKAI No. 54-147,012, and copending Japanese Utility Model Application KOKAI No. 55-79,147, by the Pioneer Electronic Corporation. The control circuit 1 is illustrated in FIG. 2.

Push button switches SW3, SW4 and SW5 serve for fast-forward, replay and rewind operations, respectively.

A switch SW6 is a re-starter switch, a switch SW8 is a switch adapted to be closed when the tape comes to its end and the tension to the tape is above a given level, thereby to detect the end of the tape, and SW9 is a mode selection switch.

SR, SP and SF are solenoids for rewind, playback and fast-forward operations, respectively. The solenoid SR is energized when the rewind operation switch SW5 is closed by the control circuit 1 to bring the tape player into a rewind state. The solenoid SF is energized when the fast-forward operation switch SW3 is closed by the control circuit 1 to bring the tape player into a fast-forward state. The deck assembly 2 is constructed such that a head carriage and a pinch roller are brought out of operational engagement and a fast-forward or rewind idler is brounght into operational engagement for fast-forward or rewind operation when the switch SW3 or SW5 is closed.

The solenoid SP is energized when the tape end detecting switch SW8 is closed for a given time period to provide for reversal of the playback direction.

G1, G3, G6, G7, G8, G9, G10, G11, G17 and G18 are inverters, G2, G5, G14 and G15 are OR gates, G12 and G13 are AND gates, G19 is a NAND gate, and G4 and G16 are NOR gates.

The inverters G9 and G10, resistors R1 and R2 and a capacitor C form a delay circuit 4. The NAND gate G19 and the inverter G11 form a blocking circuit for blocking the output of the control circuit 1 to the solenoid SP when needed.

The output of the switch SW8 is fed through the inverter G3 to the counter 3 where the number of on/-off operations of the switch SW8 is counted. The counter 3 has outputs Q2 and Q3 connected to the AND gates G12 and G13, respectively, the outputs of which are connected to the OR gate G14. These gates form a selection circuit the output of which is controlled by an external signal in combination with the counter outputs Q2 and Q3. The output of the selection circuit is supplied to the gate G2 while it is also supplied to D-type flip-flop DFF via the OR gate G15 to clear the D-type flip-flop. The D-type flip-flop DFF receives as a clock input a signal representative of the build-up of the output of the power source 5 with a delay created by the delay circuit 4 and is set thereby. The output Q of the D-type flip-flop DFF activates a drive circuit 6 for driving the relay RY.

As a result of voltage application to the deck assembly 2, the counter 3 and D-type flip-flop DFF are cleared. The counter 3 is also cleared by means of the mode selection switch SW9.

FIG. 2 illustrates the control circuit 1. It should be noted that in the description of FIG. 2, solenoids SR, SF and SP represent plungers driven by the associated solenoids as well as solenoids themselves.

The control circuit includes a monostable multivibrator triggered by the rising edge of a signal resulting from depression of a replay button; flip-flops operated by the rising edge of signals resulting from depression of fast-forward and rewind buttons, respectively; a plunger adapted to be energized by the output of the monostable multivibrator to thereby change the direction of tape transportation or to advance a head carriage forward; plungers adapted to be energized by the output of the flip-flops to control fast-forward and rewind operations, respectively; a switch adapted to operate upon receipt of a signal representative of the tape end to trigger the monostable multivibrator; and a reset input circuit for supplying the output of the monostable multivibrator to the reset terminals of the flip-flops.

A typical example of the control circuit 1 is illustrated in FIG. 2. FF11 is a flip-flop adapted to operate by the rising edge of a signal resulting from the pressing operation of the rewind button switch SW5, FF12 is a flip-flop adapted to operate by the rising edge of a signal resulting from the pressing operation of the fast-forward button switch SW3. A flip-flop FF13, a resistor R1, a capacitor C1 and an inverter G38 form a monostable multivibrator which is triggered by a signal produced by pressing the replay button switch SW4. The solenoid SR is energized by the output Q of the flip-flop FF11 via a driving transistor Q11 to bring the tape player into a rewind state. The solenoid SF is energized by the output Q of the flip-flop FF12 via a driving transistor Q12 to bring the tape player into a fast-forward state. The solenoid SP is energized by the output Q of the monostable multivibrator FF13 via a driving transistor Q13 to bring the tape player into a playback state.

A switch SW7 is turned off by a head carriage-advancing lever when the head carriage is advanced. The switch SW8 is a normal-open switch which is closed when the tape comes to its end.

Inverters G24, G25 and G26 are connected such that when any one of the push button switches SW3, SW4 and SW5 is closed, the two of the AND gates G21, G22 and G23 corresponding to the remaining unoperated two switches are disabled. For example, when the fast-forward push button switch SW3 is pressed, the inverter G25 disables the AND gates G21 and G22. Inverters G27 to G30 serves to set priority for selecting playback operation by utilizing the time delays in the inverters G27 and G28 and the inverters G29 and G30 when the fast-forward, replay and rewind push button switches SW3, SW4 and SW5 are pressed at the same time.

The operation of the control circuit 1 is as follows. After a recorded tape is loaded, both the reel spindles are rotated in the take-up direction to tighten the tape. Then, the tape is tensioned as if the tape had come to its end in the course of tape transportation and the switch SW8 is turned on. With the switch SW8 turned on, the OR gate G36 produces an output of a low level and the NAND gate G37 then produces an output of a high level. The nomostable multivibrator FF13 is then triggered to energize the solenoid SP. The monostable multivibrator FF13 is reset after a given time lapse depending on the time constant determined by the resistor R1 and capacitor C1, so that the solenoid SP is de-energized. During the interval when the solenoid SP is on, the plunger associated with the solenoid SP advances the head carriage of the player, thereby bringing the tape player into a playback state in a given direction and maintaining this state. The advance of the head carriage causes the switch SW27 to turn to off.

When the tape comes to its end in the course of playback operation, the tape is tensioned to turn on the switch SW8 again to energize the solenoid SP for a given time as described above. As a result of this energization, the direction of tape transportation is reversed, and the playback operation in the opposite direction is provided and maintained. In this manner, each time the switch SW8 is turned on, the playback direction of the tape is reversed, that is, tape is successively played back in one direction and reverse directions along its different two channels for each direction.

If the replay push button switch SW4 is pressed during the playback operation, the AND gate G22 produces a high output, immediately closing the AND gates G21 and G23. The high level output of the AND gate G22 causes the NAND gate G35 to produce a low output which is supplied through the NAND gate G37 to the monostable multivibrator FF13 to energize the solenoid SP for a given time. This energization of the solenoid SP causes to reverse the direction of tape transportation as described above.

If it is desired to start fast-forward operation during the forward playback operation, the fast-forward push button switch SW3 is pressed. With the switch SW3 pressed, the AND gate G23 becomes conductive and the flip-flop FF12 is triggered to energize to solenoid SF. The energization of the solenoid SF is retained by the output Q of the flip-flop FF12 even after the switch SW3 is released. This energization brings the tape player into a fast-forward state. When the tape comes to its end during this fast-forward operation, the switch SW8 is turned on and the flip-flop FF12 is reset by the output Q of the monostable multivibrator FF13 via the OR gate G32, de-energizing the solenoid SF. As a result, the tape player is brought into a playback state. In this case, the playback operation will take place in the same direction as the preceding fast-forward operation. However, the switch SW8 is again turned on because of the tape end, thereby energizing the solenoid SP to reverse the direction of tape transportation to provide normal playback operation.

If the rewind push button switch SW5 is pressed during the fast-forward operation, the AND gate G21 produces a higher output which is fed through the OR gate G32 to the flip-flop FF12 to reset the flip-flop. At the same time, the flip-flop FF11 is triggered to energize the solenoid SR, thereby initiating tape rewind operation.

Returning to FIG. 1, the operation of the control device according to the present invention is described below.

When the recorded tape is loaded on the tape player, the switch SW1 is operated to turn on the power. A constant voltage is supplied to the control unit from the voltage stabilizer circuit 5.

The output of the voltage stabilizer circuit 5 is supplied with a slight delay to the D-type flip-flop DFF via the delay circuit 4. Then the D-type flip-flop DFF produces a high output at Q to energize the relay RY and turn on the switch SW2. As a result, voltage is supplied to the deck assembly 2 to provide a complete operation state.

With the switch SW2 closed, the slack of tape is first pulled in. At the time the tape slack is pulled in, the switch SW8 makes an on/off operation. In response to the output pulse of the switch SW8, the solenoid SP is energized for a given time by the agency of the control circuit 1. Then playback operation is carried out as described above.

On the other hand, since the output pulse of the switch SW8 is inverted by the inverter G3 before it is applied to the counter 3, the counter 3 counts one pulse and produces a Q1 output of high level.

It is assumed that the mode selection switch SW9 is set at mode A. At the point when the tape comes to its end again, the switch SW8 makes again and then the conter 3 counts another pulse and produces a Q2 output of higher level. As a result, the point A also goes high via the AND gate G12 and OR gate G14. Then the D-type flip-flop DFF is cleared and the relay RY is deenergized to break the contact of SW2. The NAND gate G19 is turned off and the inverter G11 produces a low output to deenergize th solenoid SP. The pulse is also supplied via the OR gate G2 to the control circuit 1 which energizes the solenoid SR for a given time. In this manner, power supply to the deck assembly is interrupted and the head carriage and the pinch roller are brought out of operational engagement or shut off by means of the solenoid SR. As a result, the recorded tape is played back only in one direction, providing unidirectional playback operation.

Next, it is assumed that the mode selection switch SW9 is set at mode B. With the recorded tape loaded the deck assembly 2 is powered on and the tape is played back as a result of the first on/off operation of the switch SW8 in the same manner as described above in connection with the mode A operation. When the recorded tape comes to its first end (for the first time), the counter 3 produces a high output at Q2. Since the output Q2 of the counter 3 is blocked by the AND gate G12, the point A remains at lower. Therefore, the on/-off operation of the switch SW8 as a result of the first termination of tape transportation at its end causes the control circuit 1 to energize the solenoid SP for a given time. This energization of the solenoid SP causes to reverse the direction of tape transportation so that reverse playback operation is carried out in succession. At the termination of this reverse playback operation, the switch SW8 makes again, causing the counter 3 to produce a high output at Q3. The point A goes high by the agency of the AND gate G13 and OR gate G14. With point A at high, the subsequent operation is the same as described above in connection with the mode A operation. The recorded tape is played back in one direction and then in the reverse direction in this manner, providing reverse playback operation.

Next, it is assumed that the mode selection switch SW9 is set at mode C. With the recorded tape loaded, the deck assembly 2 is powered on and the tape is played back as a result of the first on/off operation of the switch SW8 in the same manner as described above in connection with the mode A operation. In this case, however, the selection circuit consisting of the AND gates G12 and G13 and the OR gate G14 is always blocked in a closed state. The point A can never be at high and remains at low. Even when the switch SW8 makes and the counter 3 changes its output upon termination of tape transportation at its end, the output of the counter 3 is blocked. Thus the on/off operation of the switch SW8 only serves to energize the solenoid SP for a given time thereby providing reversal transportation. Consequently, the tape is turned to its playback direction each time it comes to its ends. Automatic repeated playback operation is thus accomplished.

The NOR gage G4 serves to clear the counter 3 when the mode selection switch SW9 is turned to a new mode. The counter 3 begins counting from a reset state after each mode selection.

The restart switch SW6 is used when it is desired to start playback operation again from an automatic shut-off state. By closing the restart switch SW6, the D-type flip-flop DFF is set via the NOR gate G16. The output of the OR gate G5 goes high simultaneously to clear the counter 3 which will start counting from a newly reset state. Then the switch SW2 is turned on to start playback operation.

It is, of course, possible to eject the recorded tape before it is loaded again. When the tape is ejected, the switches SW1 and SW2 are turned off and the counter 3 and D-type flip-flop DFF are cleared, interrupting the entire circuitry.

The switch SW2 is a relay contact in the above-described embodiment. It may be replaced by a semiconductor switch with the same result.

According to the present invention, a single cassette tape player may be provided with multiple modes of playback operation. In this tape player, the playback operation mode may be selected among unidirectional playback operation, automatic reverse playback operation in one and reverse directions, and automatic repeated reverse playback operation.

When the unidirectional playback operation or the reverse playback operation is selected, the player is automatically shut off after termination of the playback operation. It is therefore unnecessary to eject the tape so that damage to tape, head and pinch roller is minimized.

What is claimed is:
1. In a tape player control device for selecting the tape playback operation mode, the device including:
   fast-forward, replay and rewind push-button switches for tape fast-forward operation, replay operation and rewind operation, respectively,
   solenoid fast-forward means for bringing the tape player into a fast-forward state and responsive to said fast-forward switch,
   solenoid replay means for bringing the tape player into a playback state and responsive to said replay switch,
   solenoid rewind means for bringing the tape player into a rewind state, and responsive to said rewind switch,
   circuit control means for controlling the solenoid fast-forward means, replay means and rewind means, and cooperating with said fast-forward, replay and rewind switches,
   said circuit control means comprising first and second flip-flops operating in response to signals produced upon closing of said fast-forward and rewind switches, respectively,
   a monostable multivibrator triggered by a signal transmitted upon closing of said replay switch, and
   means for resetting said first and second flip-flops upon receipt of the output of the monostable multivibrator, and
   a tape end detecting switch operating in response to a signal representative of the end of the tape for triggering the monostable multivibrator,
   the solenoid fast-forward means and rewind means being energized by the output of said first and second flip-flops, respectively,
   the solenoid playback means being energized by the output of the monostable multivibrator,
   the improvement comprising
   a counter for counting the number of on/off operations of said tape end detecting switch,
   a mode selection switch for changing the playback operation of the tape, and cooperating with said counter,
   circuit selection means for selecting and blocking the output of said counter in accordance with a mode selection output of said mode selection switch, an OR gate having an input connected to the output of said circuit selection means, or the output of said rewind switch, and having an output connected to said resetting means, circuit means for blocking the output of said resetting means to the solenoid playback means in accordance with the output of said circuit selection means, and circuit means for applying voltage to a deck assembly in synchronization with the loading operation of the tape, and cancelling the voltage application to the deck assembly in response to the output of said circuit selection means, whereby the tape playback operation mode is selected among unidirectional playback operation, automatic reverse playback operation in one and reverse directions, and automatic repeated reverse playback operation in one and reverse directions.

2. The device according to claim 1, in which the solenoid playback means responsive to the output of the monostable multivibrator advance a head carriage of the tape player forward, so as to bring the tape player into a playback state in a given direction.

3. The device according to claim 1, in which the solenoid playback means responsive to the output of the monostable multivibrator change the direction of tape transportation.

* * * * *